(12) United States Patent
Stephenson

(10) Patent No.: US 11,560,273 B2
(45) Date of Patent: Jan. 24, 2023

(54) VEHICLE CONVEYOR SYSTEM AND SURFACE SYSTEM FOR A VEHICLE CONVEYOR

(71) Applicant: Stephenson Technologies Inc., Barrie (CA)

(72) Inventor: Robert Roy Stephenson, Barrie (CA)

(73) Assignee: Stephenson Technologies Inc., Barrie (CA)

( * ) Notice: Subject to any disclaimer, the term of this patent is extended or adjusted under 35 U.S.C. 154(b) by 0 days.

(21) Appl. No.: 17/455,556

(22) Filed: Nov. 18, 2021

(65) Prior Publication Data
US 2022/0153542 A1    May 19, 2022

Related U.S. Application Data

(60) Provisional application No. 63/123,272, filed on Dec. 9, 2020, provisional application No. 63/115,372, filed on Nov. 18, 2020.

(51) Int. Cl.
| | |
|---|---|
| *B65G 21/20* | (2006.01) |
| *B65G 45/02* | (2006.01) |
| *B65G 21/10* | (2006.01) |
| *B65G 67/30* | (2006.01) |
| *B60S 3/00* | (2006.01) |

(52) U.S. Cl.
CPC ......... *B65G 21/2072* (2013.01); *B65G 21/10* (2013.01); *B65G 45/02* (2013.01); *B65G 67/30* (2013.01); *B60S 3/004* (2013.01); *B65G 2201/0294* (2013.01)

(58) Field of Classification Search
CPC .... B65G 21/2072; B65G 21/10; B65G 45/02; B65G 67/30; B65G 2201/0294; B65G 15/12; G60S 3/004
See application file for complete search history.

(56) References Cited

U.S. PATENT DOCUMENTS

| | | | | |
|---|---|---|---|---|
| 1,694,197 | A * | 12/1928 | Woodling | B60S 3/004 |
| | | | | 134/124 |
| 3,596,606 | A * | 8/1971 | Smith, Jr. | B61B 10/046 |
| | | | | 104/172.3 |
| 7,278,533 | B2 * | 10/2007 | Horn | B65G 15/22 |
| | | | | 198/817 |
| 7,302,894 | B2 * | 12/2007 | Belanger | B60S 3/004 |
| | | | | 104/162 |
| 7,571,682 | B2 * | 8/2009 | Bianco | B60S 3/004 |
| | | | | 104/242 |

(Continued)

*Primary Examiner* — Mark A Deuble
(74) *Attorney, Agent, or Firm* — Laurence A. Greenberg; Werner H. Stemer; Ralph E. Locher

(57) ABSTRACT

In an aspect, a conveyor system is provided for a vehicle having wheels. The conveyor system includes a conveyor having an inlet end positioned to receive a vehicle to be conveyed, and an exit end positioned for exiting of the vehicle off of the conveyor, and a surface positioned proximate to at least one of the inlet end and the exit end. The surface is positioned to support at least one of the wheels while at least another of the wheels is supported on the conveyor. The surface has surface properties selected such that a coefficient of friction between the surface and tire rubber is below a selected threshold so as to permit sliding of the at least one of the wheels on the surface while the at least another of the wheels is supported on the conveyor.

16 Claims, 6 Drawing Sheets

(56) References Cited

U.S. PATENT DOCUMENTS

| | | | | |
|---|---|---|---|---|
| 9,371,059 B2* | 6/2016 | MacNeil | ............... | B60S 3/004 |
| 9,745,142 B2* | 8/2017 | Stephenson | ............ | B60S 3/004 |
| 10,150,455 B1* | 12/2018 | Gile | ..................... | B65G 47/66 |
| 10,414,591 B1* | 9/2019 | Stephenson | ............ | B65G 15/62 |
| 10,947,051 B2* | 3/2021 | Stephenson | ............ | B60S 3/004 |
| 11,053,079 B2* | 7/2021 | Boelryk | ................. | B60S 3/004 |
| 2006/0191773 A1* | 8/2006 | Horn | ..................... | B65G 15/12 |
| | | | | 198/817 |
| 2010/0108467 A1* | 5/2010 | Barreyre | ................ | B60S 3/004 |
| | | | | 198/850 |

* cited by examiner

VEHICLE CONVEYOR SYSTEM AND SURFACE SYSTEM FOR A VEHICLE CONVEYOR

CROSS-REFERENCE TO RELATED APPLICATIONS

The present application claims the benefit of U.S. Provisional Application Nos. 63/115,372 filed Nov. 18, 2020, and 63/123,272, filed Dec. 9, 2020, the contents of both of which are incorporated herein in their entireties.

FIELD

The specification relates generally to conveyors, and in particular to a vehicle conveyor system and surface system for a vehicle conveyor.

BACKGROUND OF THE DISCLOSURE

Vehicle conveyors are known. A vehicle can enter onto the vehicle conveyor, and can be transported by the vehicle conveyor along a selected path. During entry of the vehicle onto the vehicle conveyor there is a point at which one or more front wheels are positioned on the endless belt(s). As will be appreciated, in this state, the rear wheels of the vehicle are not yet positioned on the vehicle conveyor. If the rear wheels of the vehicle are braked or somehow otherwise unable to freely rotate, they can resist forward movement of the vehicle via friction between the rear wheels and the inlet surface at the inlet end of the vehicle conveyor.

Similarly, when a vehicle is exiting from the vehicle conveyor, there is a point at which its one or more front wheels will be positioned on the exit surface that is at the exit end of the vehicle conveyor, while its rear wheels are still positioned on the vehicle conveyor. If the front wheels are not able to freely rotate, either as a result of the application of a brake or the vehicle being in park (for an automatic transmission vehicle), friction between the locked front wheels of the vehicle and the exit surface can resist forward movement of the vehicle being urged forward by contact between the rear wheels and the vehicle conveyor.

Both of the above scenarios can strain the drive motor(s), conveyor surfaces (e.g., belt or belts as the case may be), or other parts of the vehicle conveyor and can potentially damage components of the vehicle, such as the tires and transmission.

SUMMARY OF THE DISCLOSURE

In an aspect, a vehicle conveyor system is provided for a vehicle having a plurality of wheels. The vehicle conveyor system includes a vehicle conveyor having a mounting end (also referred to as an inlet end) positioned to receive a vehicle to be conveyed, and a dismounting end (also referred to as an exit end) positioned for exiting of the vehicle off of the vehicle conveyor, and a surface positioned proximate to at least one of the inlet end of the vehicle conveyor and the exit end of the vehicle conveyor. The surface is positioned to support at least one of the plurality of wheels while at least another of the plurality of wheels is supported on the vehicle conveyor. The surface has surface properties selected such that a coefficient of friction between the surface and tire rubber is below a selected threshold so as to permit sliding of said at least one of the plurality of wheels on the surface while said at least another of the plurality of wheels is supported on the vehicle conveyor.

The surface can have surface properties selected such that the surface and tire rubber have a coefficient of friction that is lower than 0.3. The surface can have surface properties selected such that the surface and tire rubber have a coefficient of friction that is lower than 0.25. The surface can have surface properties selected such that the surface and tire rubber can have a coefficient of friction that is lower than 0.2.

The surface can be at least partially made of polytetrafluoroethylene.

The surface can be at least partially made of a polymer. The polymer can be an ultra high molecular weight polyethylene (UHMW). An additive can be added to the UHMW to decrease the coefficient of friction of the surface.

The vehicle conveyor system can further include a lubrication arrangement for lubricating the surface. The lubrication arrangement can include at least one nozzle positioned to spray a lubricating fluid onto the surface. The lubrication arrangement can include at least one aperture in the deck region in fluid communication with a lubricating fluid source configured to dispense a lubricating fluid through the at least one aperture.

The lubricating fluid can include a surfactant.

In another aspect, a surface system is provided for a vehicle conveyor for a vehicle having a plurality of wheels. The surface system includes a surface positioned proximate to at least one of an inlet end of the vehicle conveyor, and an exit end of the vehicle conveyor, and a lubrication arrangement positioned to supply a lubricating fluid on top of the surface The surface, when lubricated with the lubricating fluid, has surface properties selected such that a coefficient of friction between the surface and tire rubber is below a selected threshold so as to permit sliding of at least one of the plurality of wheels on the surface while at least another of the plurality of wheels is supported on the vehicle conveyor.

The lubrication arrangement can include at least one nozzle in fluid communication with a lubricating fluid source and positioned to spray the lubricating fluid onto the surface.

The lubrication arrangement can include at least one aperture in the surface in fluid communication with a lubricating fluid source configured to dispense the lubricating fluid through the at least one aperture.

The lubricating fluid can include a surfactant.

Other technical advantages may become readily apparent to one of ordinary skill in the art after review of the following figures and description.

BRIEF DESCRIPTIONS OF THE DRAWINGS

For a better understanding of the embodiment(s) described herein and to show more clearly how the embodiment(s) may be carried into effect, reference will now be made, by way of example only, to the accompanying drawings in which.

Figure 1:
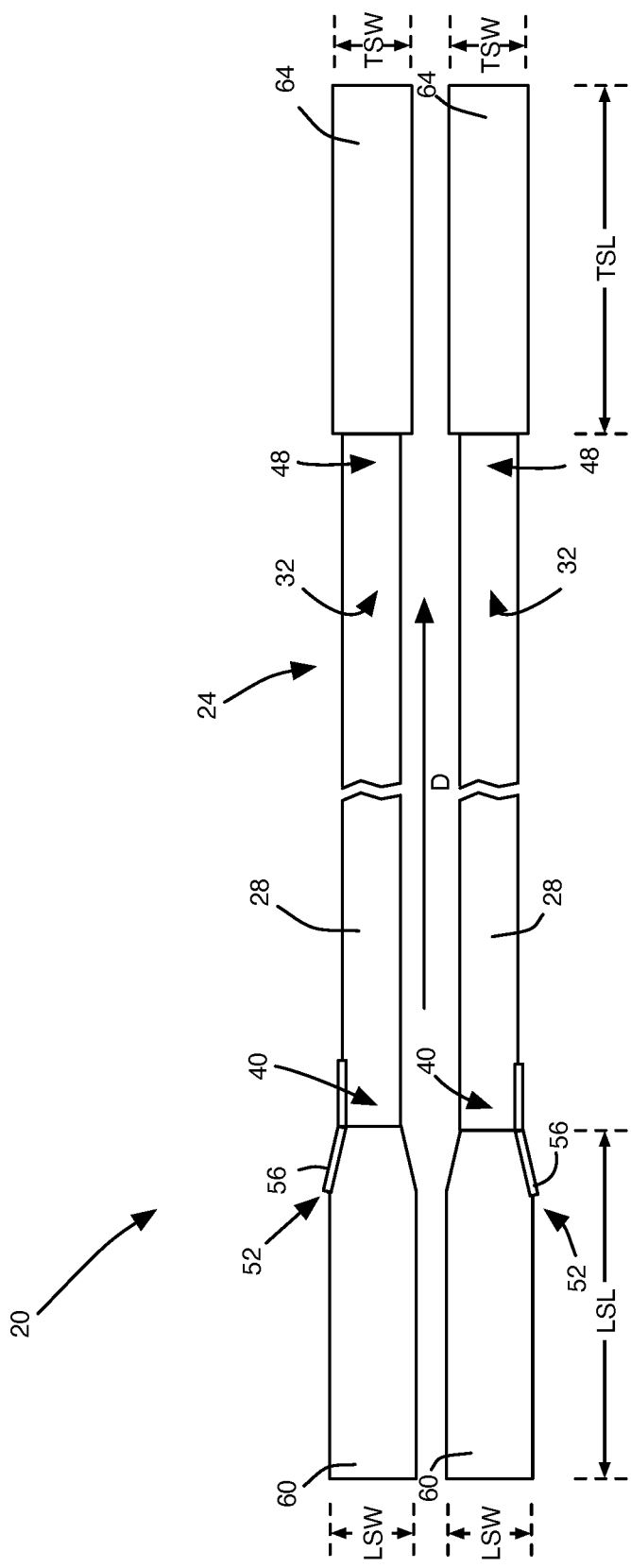
FIG. 1 shows a top schematic view of a vehicle conveyor having two endless belts, and a surface extending from at least one of a mounting end and a dismounting end of the vehicle conveyor.
Figure 2:
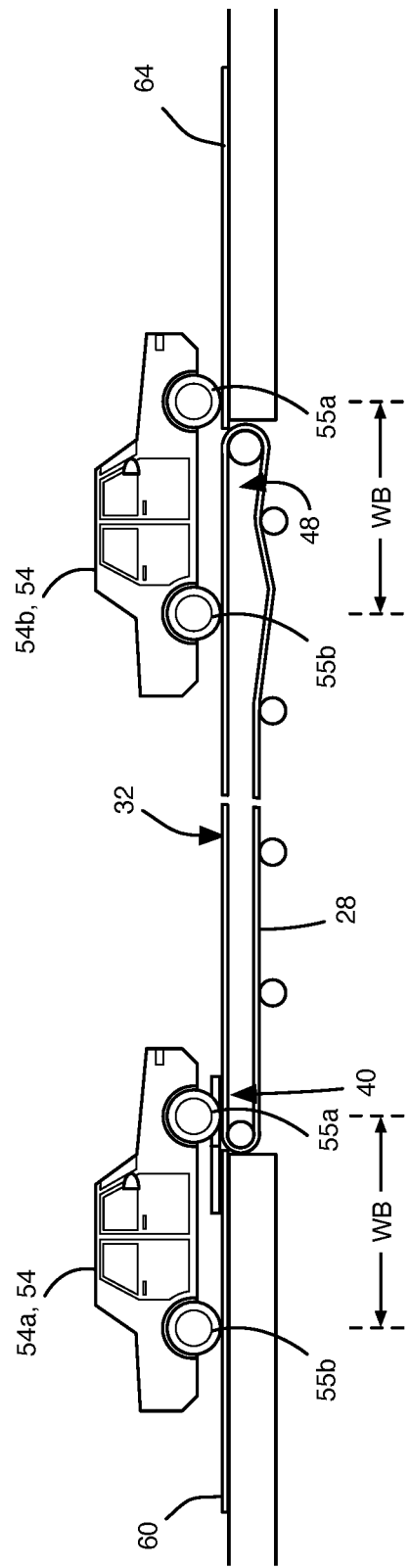
FIG. 2 is a side section view of the correlator system in FIG. 1 with a vehicle partially positioned on the vehicle conveyor at the inlet end and a vehicle partially positioned on the vehicle conveyor at the exit end.
Figure 5:
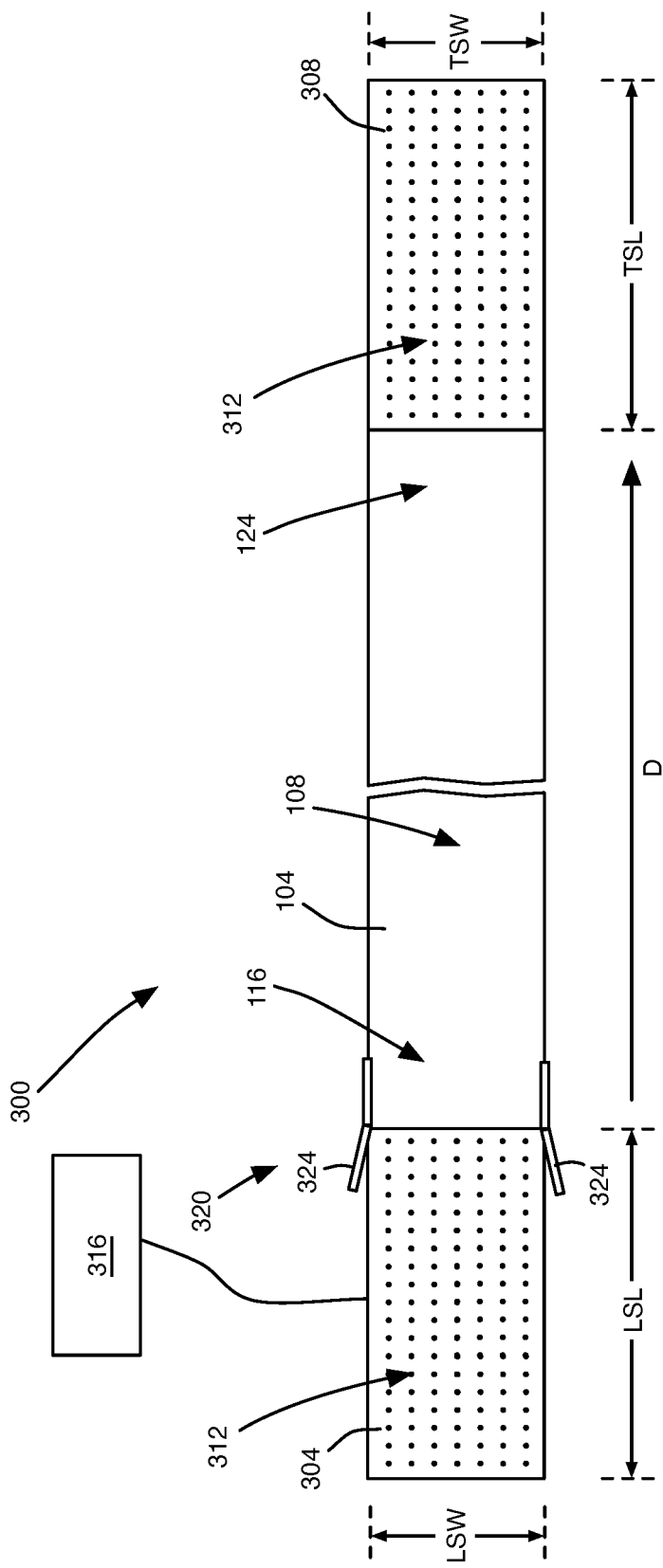
Figure 6:
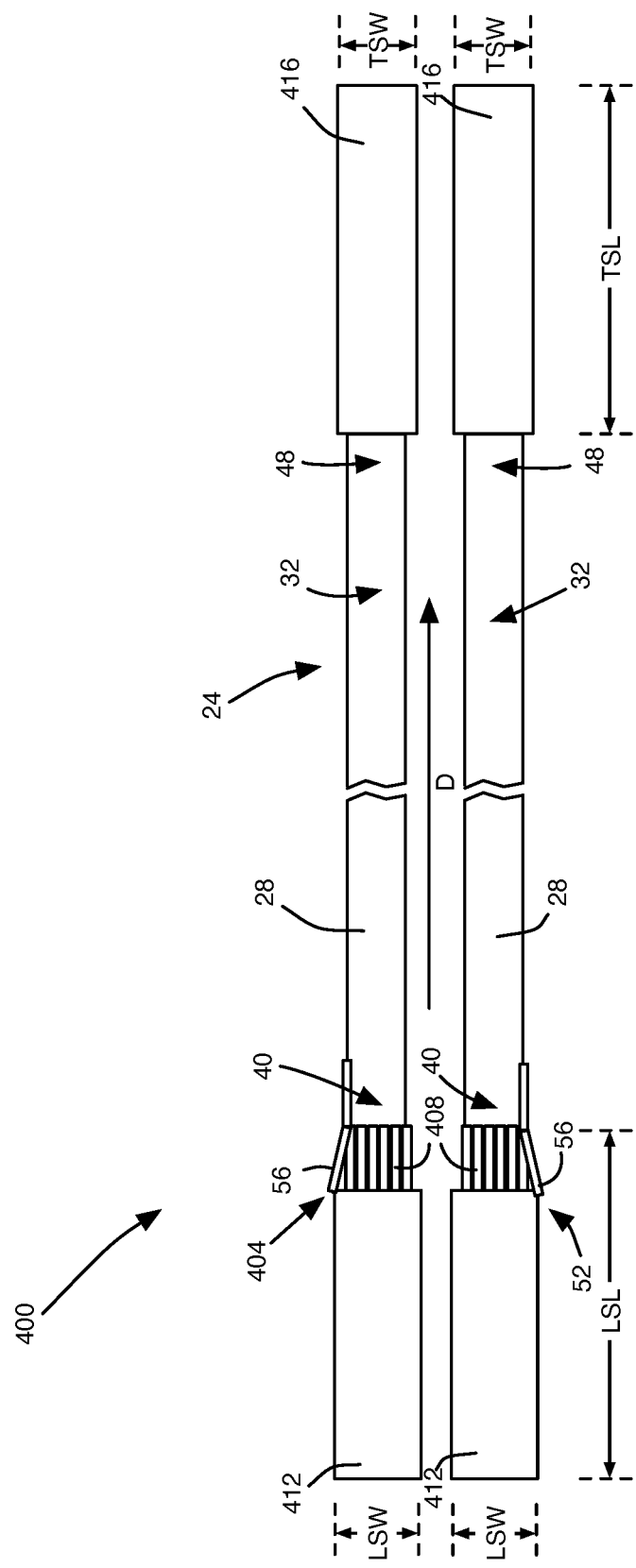

FIG. 5 is a top schematic view of a vehicle conveyor and a surface extending from an inlet end and an exit end of the vehicle conveyor in accordance with a further embodiment, wherein the surface has an array of apertures for introducing a lubricating fluid onto a top surface thereof; and FIG. 6 is a top schematic view of a vehicle conveyor similar to that of FIGS. 1 and 2 in accordance with yet another embodiment, wherein the correlators have mechanical structures for facilitating lateral shifting of the wheels of a vehicle.

Unless otherwise specifically noted, articles depicted in the drawings are not necessarily drawn to scale.

DETAILED DESCRIPTION

For simplicity and clarity of illustration, where considered appropriate, reference numerals may be repeated among the Figures to indicate corresponding or analogous elements. In addition, numerous specific details are set forth in order to provide a thorough understanding of the embodiment or embodiments described herein. However, it will be understood by those of ordinary skill in the art that the embodiments described herein may be practiced without these specific details. In other instances, well-known methods, procedures and components have not been described in detail so as not to obscure the embodiments described herein. It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and various terms used throughout the present description may be read and understood as follows, unless the context indicates otherwise: "or" as used throughout is inclusive, as though written "and/or"; singular articles and pronouns as used throughout include their plural forms, and vice versa; similarly, gendered pronouns include their counterpart pronouns so that pronouns should not be understood as limiting anything described herein to use, implementation, performance, etc. by a single gender; "exemplary" should be understood as "illustrative" or "exemplifying" and not necessarily as "preferred" over other embodiments. Further definitions for terms may be set out herein; these may apply to prior and subsequent instances of those terms, as will be understood from a reading of the present description. It will also be noted that the use of the term "a" or "an" will be understood to denote "at least one" in all instances unless explicitly stated otherwise or unless it would be understood to be obvious that it must mean "one".

Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

A vehicle conveyor system, and a surface system for a vehicle conveyor are disclosed. In some embodiments, the vehicle correlator system includes a vehicle conveyor having an inlet end positioned to receive a vehicle to be conveyed, and an exit end positioned for exiting of the vehicle off of the vehicle conveyor. A surface is proximate to at least one of the inlet end and the exit end of the vehicle conveyor. One or both of an inlet surface and an exit surface may have surface properties selected such that a coefficient of friction between the inlet surface and tire rubber is below a selected threshold so as to permit sliding of at least one of the plurality of wheels on the inlet surface while at least another of the plurality of wheels is supported on the vehicle conveyor.

In other embodiments, a surface system for a vehicle conveyor includes a surface extending from at least one of an inlet end of the vehicle conveyor positioned to receive a vehicle to be conveyed, and an exit end positioned for exiting of the vehicle off of the vehicle conveyor. A lubrication arrangement is positioned to supply a lubricating fluid on top of the surface. The surface, when lubricated with the lubricating fluid, has surface properties selected such that a coefficient of friction between the surface and tire rubber is sufficiently low to permit sliding of at least one wheel of the vehicle positioned thereon when the vehicle is at least partially engaged by the vehicle conveyor.

When a vehicle is partially engaged by a vehicle conveyor and its wheels positioned on the drive surface leading to the vehicle conveyor are locked, either by the application of brakes or by the vehicle being in park (for a rear wheel drive where the vehicle is being mounted onto the vehicle conveyor in a forward direction) can cause friction between the locked wheels of the vehicle with the drive surface, thereby resisting movement forward. This can place a strain on a drive motor of the vehicle conveyor as it has to overcome the friction between the wheels of the vehicle with the drive surface in order to urge the vehicle forward. Further, the wheels and/or other components of the vehicle and vehicle conveyor may be damaged as a result of this dragging.

By sufficiently reducing traction between the wheels of a vehicle and the drive surface immediately before the vehicle conveyor, when the vehicle is engaged by the vehicle conveyor (such as by having its front wheels positioned thereon) and the vehicle conveyor is moving to urge the vehicle forward, the wheels positioned off of the vehicle conveyor can slide towards and mount onto the vehicle conveyor, thereby decreasing the risk of damage to the vehicle and the drive motor of the vehicle conveyor.

Similarly, when a vehicle is positioned towards the exit end of the vehicle conveyor and its leading wheel(s) are positioned on the exit surface that is proximate the vehicle conveyor and locked, either by the application of brakes (like a parking brake) or by the vehicle being in park (for a front wheel drive where an automatic transmission vehicle is being mounted onto the vehicle conveyor in a forward direction) can cause friction between the locked wheels of the vehicle with the drive surface, thereby resisting movement forward. Again, this can place a strain on the drive motor of the vehicle conveyor as it has to overcome the friction between the wheels of the vehicle with the drive surface in order to urge the vehicle forward and off of the vehicle conveyor. Further, the wheels and/or other components of the vehicle may be damaged as a result of this dragging.

Sufficient reduction of the traction between the wheels of a vehicle and the drive surface immediately after the vehicle conveyor, when the vehicle is engaged by the vehicle conveyor (such as by having its rear wheels positioned thereon) and the vehicle conveyor is moving to urge the vehicle forward and off of the vehicle conveyor, the wheels positioned off of the vehicle conveyor can slide forward, thereby decreasing the risk of damage to the vehicle and the drive motor of the vehicle conveyor.

FIGS. 1 and 2 show a vehicle conveyor system 20 in accordance with an embodiment. The depicted vehicle conveyor system 20 is configured for use in a vehicle wash, but can also be used in a variety of other environments. The vehicle conveyor system 20 includes a vehicle conveyor 24 in the form of a pair of endless belts 28. A top portion 32 (also referred to as an upper span 32) of the endless belts 28 travels in a direction D from an inlet end 40 to an exit end 48. In FIGS. 1 and 2 (and also in FIGS. 3-6), a break is shown in the endless belts 28, which is to indicate that the overall length of the endless belts and the vehicle conveyor system 20 may be some amount longer than what is shown in these two figures.

A vehicle 54 includes a plurality of wheels shown at 55, including, in the examples shown, a plurality of front wheels 55a and a plurality of rear wheels 55b. In FIG. 2, two vehicles 54 are shown, and are identified individually at 54a and 54b.

A correlator 52 may optionally be positioned adjacent to the leading edge 36 of each endless belt 28 to guide the front wheels 55a and rear wheels 55b of any vehicles 54 entering onto the endless belts 28. Each correlator 52 includes a guide roller assembly 56. Each guide roller assembly 56 includes a roller support (not shown) that is mounted to a surface such as a floor structure or other suitable surface. The roller support has at least one guide roller that is mounted on it. The guide roller assembly 56 can be made of any suitable material that is suitably rigid to resist deformation.

An inlet surface 60 having a low coefficient of friction with tire rubber extends from each leading edge 36 of the inlet end 40 of the endless belts 28 and has an inlet surface length LSL. Being positioned proximate means that the inlet surface 60 is positioned to support at least one of the plurality of wheels 55 of the vehicle 54 while at least another of the plurality of wheels 55 is supported on the vehicle conveyor 24. Preferably the inlet surface length LSL extends by at least a wheelbase WB of most production vehicles that are expected to be serviced by the vehicle conveyor system 20. Further, preferably the inlet surfaces 60 have an inlet surface width LSW that is sufficiently wide to be positioned under the wheels of a range of vehicles as they are approaching the vehicle conveyor 24 along a variety of expected approach paths. As the leading wheels 55a of the vehicle 54a are guided by the correlators 52, thus reorienting the vehicle 54a, and then subsequently frictionally engaged by the endless belts 28 through forward movement of their upper spans 32, the trailing wheels 55b of the vehicle 54a positioned on the inlet surfaces 60 may slide laterally. By making the inlet surfaces 60 sufficiently wide, the trailing wheels 55b of the vehicle 54a can remain positioned on the inlet surfaces 60 as the leading wheels 55a of the vehicle 54a are being pulled forward by the endless belts 28.

An exit surface 64 is positioned proximate the exit end 48 of each of the endless belts 28 and have an exit surface length TSL. Being positioned proximate means that the exit surface 64 is positioned to support at least one of the plurality of wheels 55 of the vehicle 54 while at least another of the plurality of wheels 55 is supported on the vehicle conveyor 24. Preferably the exit surface length TSL is at least the wheelbase WB of most production vehicles that are expected to be serviced by the vehicle conveyor system 20. Further, preferably the exit surfaces 64 have an exit surface width TSW that is sufficiently wide to be positioned under the wheels of a range of vehicles as they are being urged off of the vehicle conveyor 24. As the vehicle 54b is being urged off of the endless belts 28 through forward movement of their upper spans 32, the leading wheels 55a of the vehicle 54b positioned on the exit surfaces 64 may slide unevenly, leading to slight reorientation of the vehicle 54b. By making the exit surfaces 64 sufficiently wide, the leading wheels 55a of the vehicle 54a can remain positioned on the exit surfaces 64 as the trailing wheels 55b of the vehicle 54b are being pushed forward by the endless belts 28.

In one present configuration, the inlet surface length LSL and the exit surface length TSL are twelve feet, and the inlet surface width LSW and the exit surface width LSW are four feet. It will be appreciated that any other inlet surface length LSL and exit surface length TSL that generally matches most or all of the largest wheelbases of vehicles expected to be serviced by the vehicle conveyor system 20 can be used. Further, it will be appreciated that any other inlet surface width LSW and exit surface width TSW that is sufficiently large to cover the expected range of lateral positions of the trailing wheels of the vehicle approaching the vehicle conveyor 24 and of the leading wheels of the vehicle being urged off of the vehicle conveyor 24 can be used.

One or both of the inlet surface 60 and the exit surface 64 may have surface properties selected such that a coefficient of friction between the inlet surface 60 and tire rubber is below a selected threshold so as to permit sliding of at least one of the plurality of wheels 55 on the inlet surface 60 while at least another of the plurality of wheels 55 is supported on the vehicle conveyor 24. In an embodiment, the inlet and exit surfaces 60, 64 have surface properties selected such that the coefficient of friction between the surfaces 60, 64 and tire rubber is lower than 0.3. Preferably, the inlet and exit surfaces 60, 64 have surface properties selected such that the coefficient of friction between the inlet and exit surfaces 60, 64 and tire rubber is lower than 0.25. More preferably, the inlet and exit surfaces 60, 64 have surface properties selected such that the coefficient of friction between the inlet and exit surfaces 60, 64 and the tire rubber is lower than 0.2. It has been found that when the inlet and exit surfaces 60, 64 have a coefficient of friction with tire rubber that is sufficiently low, the wheels 55a, 55b are effectively able to slide across the surfaces 60, 64 when the vehicle 54 is at least partially engaged by the vehicle conveyor 24.

In the illustrated embodiment, the inlet and exit surfaces 60, 64 are sheets made at least partially of low friction ultra high molecular weight polyethylene (UHMW) that are anchored to the drive surfaces leading up to and away from the vehicle conveyor 24. UHMW is an extremely tough plastic with high abrasion and wear and chemical resistance. While UHMW by itself provides a low coefficient of friction with tire rubber, it has been found that by using UHMW blended with low friction additives, such as molybdenum disulfide, the durability of the inlet and exit surfaces 60, 64 can be increased. In other embodiments, any material having a coefficient of friction with tire rubber that sufficiently inhibits traction of the wheels 55a, 55b with the inlet and exit surfaces 60, 64 so as to enable sliding of the wheels 55a, 55b when the vehicle is at least partially engaged by the vehicle conveyor 24 and that is suitable for providing a travel surface for a wheel can be employed. In still other embodiments, the surfaces 60, 64 can be made of another polymer with or without additives, polytetrafluoroethylene, etc.

Each of the inlet and exit surfaces 60, 64 can be made from a single sheet or, alternatively, can be made from two or more sheets mosaiced together to cooperatively form the surfaces. While it can be preferrable to have the sheets be relatively thin (about two inches in thickness) so that the sheets can be secured over existing structure or would require little modification to accommodate them, it is contemplated that the surfaces can be provided via thicker elements.

A portion of each inlet surface 60 extends towards a corresponding guide roller assembly 56 to guide while facilitating enabling sliding of a corresponding wheel 55 when being guided by the guide roller assembly 56.

Figure 3:
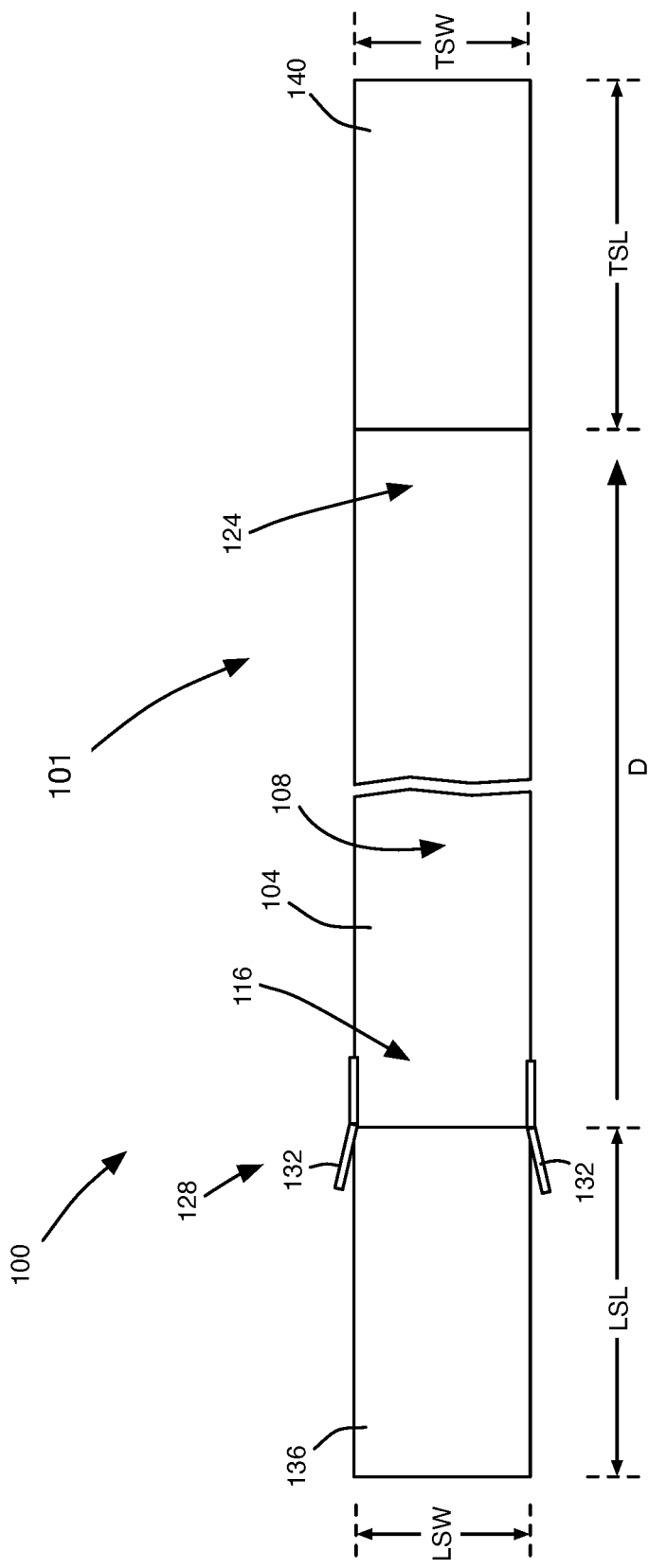
FIG. 3 is a top schematic view of a vehicle conveyor having a single endless belt, and a surface extending from at least one of an inlet end and an exit end of the vehicle conveyor in accordance with another embodiment.

FIG. 3 shows a vehicle conveyor system 100 including a vehicle conveyor 101 having a single endless belt 104 for conveying vehicles. By constructing the endless belt 104 sufficiently wide, the wheels of both lateral sides of a vehicle can be accommodated. An upper span 108 of the endless belt 104 travels from an inlet end 116 to an exit end 124 along a direction D. A correlator 128 is positioned adjacent to the inlet end 116 and includes a pair of guide roller assemblies 132 to guide the wheels of a vehicle onto the endless belt 104.

A single inlet surface 136 is positioned proximate (and in this case extends from) the inlet end 116 of the endless belt 104 and has an inlet surface length LSL, and is similar to that shown in FIGS. 1 and 2 in many regards. Being positioned proximate means that the inlet surface 136 is positioned to support at least one of the plurality of wheels 55 of the vehicle 54 while at least another of the plurality of wheels 55 is supported on the vehicle conveyor 101. Preferably the inlet surface length LSL is at least a wheelbase WB of most production vehicles that are expected to be serviced by the vehicle conveyor system 100. Further, preferably the inlet surface 136 has an inlet surface width LSW that is sufficiently wide to be positioned under the wheels of a range of vehicles as they are approaching the endless belt 104 along a variety of expected approach paths.

A single exit surface 140 is positioned proximate (and in this case extends from) the exit end 124 of the endless belt 104 and has an exit surface length TSL. Being positioned proximate means that the exit surface 140 is positioned to support at least one of the plurality of wheels 55 of the vehicle 54 while at least another of the plurality of wheels 55 is supported on the vehicle conveyor 101. Preferably the exit surface length TSL extends by at least the wheelbase WB of most production vehicles that are expected to be serviced by the vehicle conveyor system 100. Further, preferably the exit surface 140 has an exit surface width TSW that is sufficiently wide to be positioned under the wheels of a range of vehicles as they are being urged off of the endless belt 104.

The material selection for the inlet surface and the exit surface and general design are similar to those of the embodiment shown in FIGS. 1 and 2.

Figure 4:
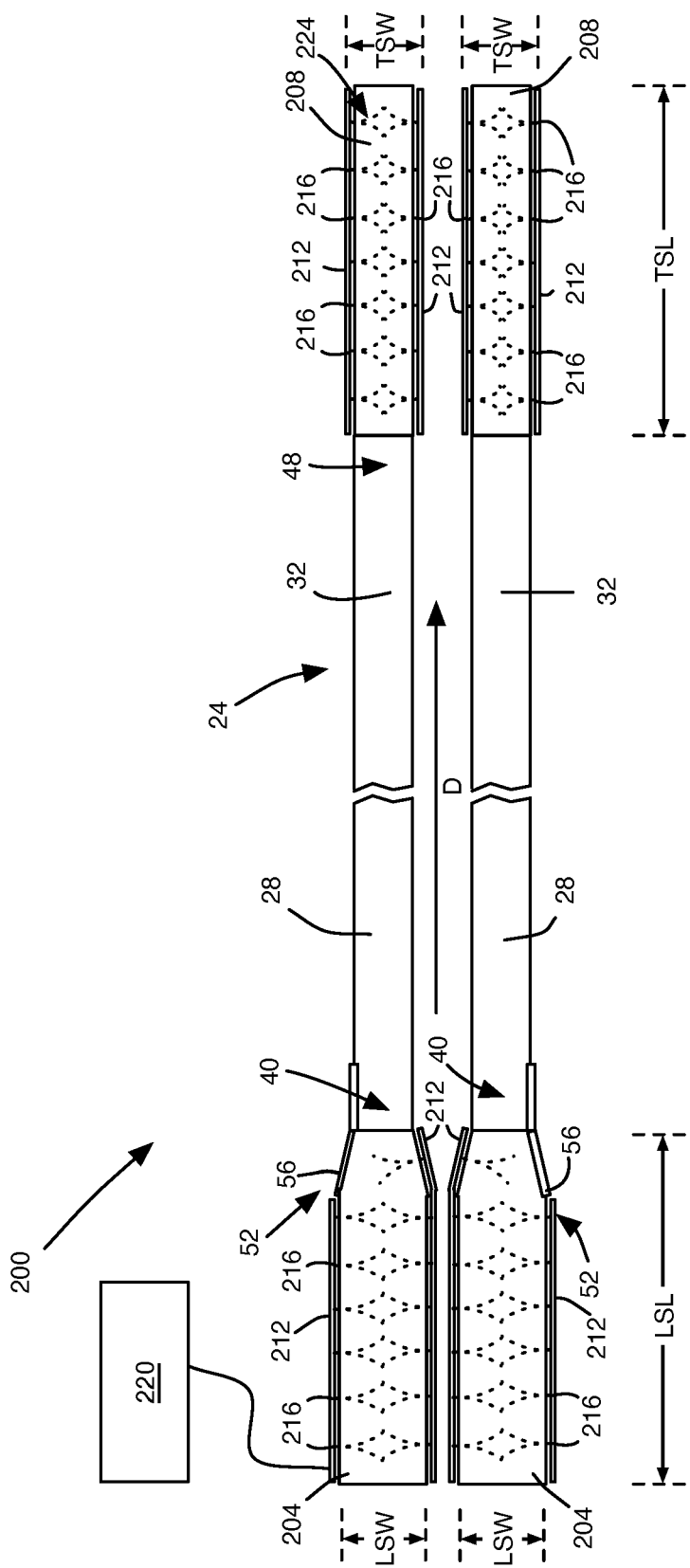
FIG. 4 is a top schematic view of a vehicle conveyor and a surface extending from an inlet end and an exit end of the vehicle conveyor in accordance with a further embodiment, wherein a lubrication arrangement is positioned to supply a lubricating fluid on top of the surface.

In FIG. 4, a vehicle conveyor system 200 similar to that of FIGS. 1 and 2 (and which may include the vehicle conveyor 24) is shown. Elements of the vehicle conveyor system 200 which have previously been described above are numbered with like reference numerals.

An inlet surface 204 is positioned proximate (and in this case extends from) the inlet end 40 of each of the endless belts 28 and has an inlet surface length LSL. Being positioned proximate means that the inlet surface 204 is positioned to support at least one of the plurality of wheels 55 of the vehicle 54 while at least another of the plurality of wheels 55 is supported on the vehicle conveyor 24. Preferably the inlet surface length LSL extends by at least a wheelbase of most production vehicles that are expected to be serviced by the vehicle conveyor system 200. Further, preferably the inlet surfaces 204 have an inlet surface width LSW that is sufficiently wide to be positioned under the wheels of a range of vehicles as they are approaching the vehicle conveyor 24 along a variety of expected approach paths.

An exit surface 208 is positioned proximate (and in this case extends from) the exit end 48 of each of the endless belts 28 and has an exit surface length TSL. Being positioned proximate means that the exit surface 208 is positioned to support at least one of the plurality of wheels 55 of the vehicle 54 while at least another of the plurality of wheels 55 is supported on the vehicle conveyor 24. Preferably the exit surface length TSL extends by at least the wheelbase of most production vehicles that are expected to be serviced by the vehicle conveyor system 200. Further, preferably the exit surfaces 208 have an exit surface width TSW that is sufficiently wide to be positioned under the wheels of a range of vehicles as they are being urged off of the vehicle conveyor 24.

The inlet surface 204 and the exit surface 208 include a lubrication system having a set of conduits 212, each with a set of nozzles 216 therealong. The conduits 212 are coupled to one or more lubricating fluid sources 220 (such as, for example, reservoirs or water pipes) that supply a lubricating fluid under pressure. The nozzles 216 are positioned to spray the lubricating fluid 224 onto the inlet and exit surfaces 204, 208.

By spraying or otherwise distributing the lubricating fluid 224 over the surfaces 204, 208, friction between wheels of vehicles and the surfaces 204, 208 can be reduced. Further, debris that can increase the traction between the wheel and the surfaces 204, 208 can be washed away by the lubricating fluid 224, thereby reducing the risk of gouging of the surfaces 204, 208 and maintaining a low coefficient of friction when a wheel of a car passes over the inlet and exit surfaces 204, 208.

The lubricating fluid 224 can be any suitable fluid for reducing friction between wheels and the inlet and exit surfaces 204, 208. In one embodiment, the lubricating fluid is water. In another embodiment, a surfactant such as a soap is added to the water to further reduce the friction between wheels and the inlet and exit surfaces 204, 208. The soap assists in clearing the surfaces 204, 208 of debris, chemicals, and other residues.

Preferably, the inlet surface 204 and the exit surface 208 are made of a material or materials that, prior to lubrication, have surface properties selected such that a coefficient of friction between each of the inlet surface 204 and the exit surface 208 and tire rubber to enable sliding of at least one wheel 55 of a vehicle 54 when the vehicle is at least partially engaged by the vehicle conveyor 104. In an embodiment, the inlet and exit surfaces 204, 208 have surface properties selected such that the coefficient of friction between the inlet and exit surfaces 204, 208 and the tire rubber is lower than 0.3. Preferably, the inlet and exit surfaces 204, 208 have surface properties selected such that the coefficient of friction between the inlet and exit surfaces 204, 208 and the tire rubber is lower than 0.25. More preferably, the inlet and exit surfaces 204, 208 have surface properties selected such that the coefficient of friction between the inlet and exit surfaces 204, 208 and the tire rubber is lower than 0.2.

FIG. 5 shows a vehicle conveyor system 300 in accordance with a further embodiment that is similar to that of FIG. 3 is shown. Elements of the vehicle conveyor system 300 which have previously been described above are numbered with like reference numerals.

An inlet surface 304 is positioned proximate (and in this case extends from) the inlet end 116 of each of the endless belt 104 and has an inlet surface length LSL. Being positioned proximate means that the inlet surface 304 is positioned to support at least one of the plurality of wheels 55 of the vehicle 54 while at least another of the plurality of wheels 55 is supported on the vehicle conveyor 101. Preferably the inlet surface length LSL extends by at least a wheelbase of most production vehicles that are expected to be serviced by the vehicle conveyor system 300. Further, preferably the inlet surface 304 has an inlet surface width LSW that is sufficiently wide to be positioned under the wheels of a range of vehicles as they are approaching the vehicle conveyor 24 along a variety of expected approach paths.

An exit surface 308 is positioned proximate (and in this case extends from) the exit end 124 of each of the endless belts 28 and has an exit surface length TSL. Being positioned proximate means that the exit surface 308 is positioned to support at least one of the plurality of wheels 55 of the vehicle 54 while at least another of the plurality of wheels 55 is supported on the vehicle conveyor 101. Preferably the exit surface length TSL extends by at least the wheelbase of most production vehicles that are expected to be serviced by the vehicle conveyor system 200. Further, preferably the exit surface 208 has an exit surface width TSW that is sufficiently wide to be positioned under the wheels of a range of vehicles as they are being urged off of the vehicle conveyor 24.

The inlet surface 204 and the exit surface 208 include a lubrication system having a set of conduits 212, each with a set of nozzles 216 therealong. The conduits 212 are coupled to one or more lubricating fluid sources 220 (such as reservoirs) that supply a lubricating fluid under pressure. The nozzles 216 are positioned to spray the lubricating fluid 224 onto the inlet and exit surfaces 204, 208.

The inlet surface 304 and the exit surface 308 include a lubrication system having a set of apertures 312 that is in fluid communication with one or more lubricating fluid sources 316 configured to dispense a lubricating fluid through the at least one aperture 312. The apertures 316 are sufficiently small to inhibit entry of debris, but sufficiently large to enable a flow of the lubricating fluid from the lubricating fluid source 316 over the top surface of the inlet surface 304 and the exit surface 308. Preferably, the at least one aperture 312 is an array of apertures that is spaced to distribute the lubricating fluid over the inlet surface 304 and the exit surface 308.

A correlator 320 is positioned towards the inlet end 116 of the endless belt 104 to guide the wheels of vehicles onto the endless belt 104. The correlator 320 includes a pair of guide roller assemblies 324 similar to the guide roller assemblies 132 depicted in FIG. 3

The inlet surface 304, at least when lubricated by the lubricating fluid dispensed through the apertures 312, has surface properties selected such that the surface and tire rubber have a coefficient of friction that enables sliding of at least one wheel of a vehicle positioned on the inlet surface 304 as it is being guided by the guide roller assemblies 324 and when the vehicle is at least partially engaged by the vehicle conveyor (via contact between one or more wheels of the vehicle).

By spraying or otherwise distributing the lubricating fluid 224 over the surfaces 204, 208, friction between wheels of vehicles and the surfaces 204, 208 can be reduced. Further, debris that can increase the traction between the wheel and the surfaces 204, 208 can be washed away by the lubricating fluid 224, thereby reducing the risk of gouging of the surfaces 204, 208 and maintaining a low coefficient of friction when a wheel of a car passes over the inlet and exit surfaces 204, 208.

The lubricating fluid 224 can be any suitable fluid for reducing friction between wheels and the inlet and exit surfaces 204, 208. In one embodiment, the lubricating fluid is water. In another embodiment, a surfactant such as a soap is added to the water to further reduce the friction between wheels and the inlet and exit surfaces 204, 208. The soap assists in clearing the surfaces 204, 208 of debris, chemicals, and other residues.

Preferably, the inlet surface 304 and the exit surface 308 are made of a material or materials that, prior to lubrication, have surface properties selected such that the inlet surface 304 and the exit surface 308 have a coefficient of friction with tire rubber to enable sliding of at least one wheel of a vehicle when the vehicle is at least partially engaged by the vehicle conveyor. In an embodiment, the inlet and exit surfaces 304, 308 have surface properties selected such that the coefficient of friction between the surfaces 304, 308 and the tire rubber is lower than 0.3. Preferably, the surfaces 304, 308 have surface properties selected such that the coefficient of friction between the surfaces 304, 308 and the tire rubber is lower than 0.25. More preferably, the surfaces 304, 308 have surface properties selected such that the coefficient of friction between the surfaces 304, 308 and the tire rubber is lower than 0.2.

FIG. 6 shows a vehicle conveyor system 400 in accordance with yet another embodiment that is similar to that of FIGS. 1 and 2 is shown. Elements of the vehicle conveyor system 400 which have previously been described above are numbered with like reference numerals. The vehicle conveyor system 400 includes a pair of endless belts 28 that extend between an inlet end 40 of the endless belts 28 and an exit end 40 of the endless belts 28.

Positioned adjacent to the inlet end 40 is a correlator 404 that includes a guide structure in the form of a pair of guide roller assemblies 56 for guiding the wheels of vehicles onto the endless belts 28. A correlator surface arrangement 408 extends from the leading edge 36 of each endless belt 28 and from the corresponding guide roller assembly 56. The correlator surface arrangement 408 can include any of a variety of mechanical structures to facilitate at least lateral movement of a wheel of a vehicle so that the wheel can be urged laterally when pressing against the guide roller assembly 56. In the illustrated embodiment, the correlator surface arrangement 408 is a set of steel rollers that have axes of rotation that are generally parallel to the travel direction D of the upper spans 32 of the endless belts 28. In another embodiment, the correlator surface arrangement can include a floor plate that is shiftable at least laterally under force by a wheel in contact with a guide structure and biased towards a central position to enable the floor plate after departure of a wheel positioned on it to return to the central position where it is ready for receiving another wheel of a vehicle.

An inlet surface 412 extends from each correlator surface arrangement 408 and has an inlet surface length LSL. In the present embodiment, the inlet surface 412 may be said to be positioned proximate to the inlet end 40, but does not extend from the inlet end 40. Being positioned proximate means that the inlet surface 412 is positioned to support at least one of the plurality of wheels 55 of the vehicle 54 while at least another of the plurality of wheels 55 is supported on the vehicle conveyor 24.

Preferably the inlet surface length LSL together with the length of the correlator surface arrangement 408 extends from the leading edge 36 of the corresponding endless belt 28 by at least a wheelbase of most production vehicles that are expected to be serviced by the vehicle conveyor system 400. Further, preferably the inlet surface 416 has an inlet surface width LSW that is sufficiently wide to be positioned under the wheels of a range of vehicles as they are approaching the vehicle conveyor 24 along a variety of expected approach paths.

An exit surface 416 is positioned proximate (and in this case extends from) the exit end 48 of each endless belt 28 and has an exit surface length TSL. Being positioned proximate means that the exit surface 416 is positioned to support at least one of the plurality of wheels 55 of the vehicle 54 while at least another of the plurality of wheels 55 is supported on the vehicle conveyor 24. Preferably the exit surface length TSL extends by at least the wheelbase of most production vehicles that are expected to be serviced by the vehicle conveyor system 200. Further, preferably the exit surface 420 has an exit surface width TSW that is sufficiently wide to be positioned under the wheels of a range of vehicles as they are being urged off of the vehicle conveyor 24.

The inlet surface 412 and the exit surface 416 have surface properties selected such that the inlet surface 412 and the exit surface 416 have a coefficient of friction with tire rubber to enable sliding of at least one wheel of a vehicle when the vehicle is at least partially engaged by the vehicle conveyor 24. In an embodiment, the inlet and exit surfaces 412, 416 have surface properties selected such that the coefficient of friction between the surfaces 412, 416 and the tire rubber is lower than 0.3. Preferably, the surfaces 412, 416 have surface properties selected such that the coefficient of friction between the surfaces 412, 416 and the tire rubber is lower than 0.25. More preferably, the surfaces 412, 416 have surface properties selected such that the coefficient of friction between the surfaces 412, 416 and the tire rubber is lower than 0.2. It has been found that when the inlet and exit surfaces 412, 416 have a coefficient of friction with tire rubber that is sufficiently low, the wheels are effectively able to slide across the surfaces 412, 416 when the vehicle is at least partially engaged by the vehicle conveyor 24.

Additionally or alternatively, a fluid lubrication system can be employed to distribute a lubricating fluid on the inlet and exit surfaces 412, 416 to provide a desired coefficient of friction between the surfaces 412, 416 and tire rubber.

Any other suitable means for lubricating the inlet and exit surfaces can be employed with the vehicle conveyor systems disclosed herein.

While, in the above-described and illustrated embodiments, both inlet and exit surfaces are provided for vehicle conveyors, it will be understood that one of the inlet and exit surfaces can be used alone with a vehicle conveyor and provide the benefits detailed above.

Although specific advantages have been enumerated above, various embodiments may include some, none, or all of the enumerated advantages.

Persons skilled in the art will appreciate that there are yet more alternative implementations and modifications possible, and that the above examples are only illustrations of one or more implementations. The scope, therefore, is only to be limited by the claims appended hereto and any amendments made thereto.

LIST OF REFERENCE NUMERALS

| | |
|---|---|
| 20 | vehicle conveyor system |
| 24 | vehicle conveyor |
| 28 | endless belt |
| 32 | upper span |
| 40 | mounting end/inlet end |
| 48 | dismounting end/exit end |
| 52 | correlator |
| 54a, 54b, 54 | vehicle |
| 55 | wheel |
| 55a | leading wheel |
| 55b | trailing wheel |
| 56 | guide roller assembly |
| 60 | inlet surface |
| 64 | exit surface |
| 100 | vehicle conveyor system |
| 101 | vehicle conveyor |
| 104 | endless belt |
| 108 | upper span |
| 116 | mounting end |
| 124 | exit end |
| 128 | correlator |
| 132 | guide roller assembly |
| 136 | inlet surface |
| 140 | exit surface |
| 200 | vehicle conveyor system |
| 204 | inlet surface |
| 208 | exit surface |
| 128 | deck region |
| 130 | surface region |
| 200 | vehicle conveyor |
| 204 | correlator |
| 208 | guide roller assembly |
| 212 | conduit |
| 216 | nozzle |
| 220 | lubricating fluid source |
| 224 | lubricating fluid |
| 300 | vehicle conveyor system |
| 304 | inlet surface |
| 308 | exit surface |
| 312 | aperture |
| 316 | lubricating fluid source |
| 320 | correlator |
| 324 | guide roller assembly |
| 400 | vehicle conveyor system |
| 404 | correlator |
| 408 | correlator surface arrangement |
| 412 | inlet surface |
| 416 | exit surface |
| D | direction |
| LSL | inlet surface length |
| LSW | inlet surface width |
| TSL | exit surface length |
| TSW | exit surface width |
| WB | wheelbase |
| DE | deck elevation |
| RA | rotation axis |
| RE | receiving end |
| TLR | target lateral range |
| VP | vehicle path |

What is claimed is:

1. A vehicle conveyor system for a vehicle having a plurality of wheels, the vehicle conveyor system comprising:
a vehicle conveyor having an inlet end positioned to receive a vehicle to be conveyed, and an exit end positioned for exiting of vehicle off of the vehicle conveyor; and
a surface positioned proximate to at least one of the inlet end of the vehicle conveyor and the exit end of the vehicle conveyor, wherein the surface is positioned to support at least one of the plurality of wheels while at least another of the plurality of wheels is supported on the vehicle conveyor, the surface having surface properties selected such that a coefficient of friction between the surface and tire rubber is below a selected threshold so as to permit sliding of said at least one of the plurality of wheels on the surface while said at least another of the plurality of wheels is supported on the vehicle conveyor.

2. The vehicle conveyor system of claim 1, wherein the surface has surface properties selected such that the coefficient of friction is lower than 0.3.

3. The vehicle conveyor system of claim 2, wherein the surface has surface properties selected such that the coefficient of friction is lower than 0.25.

4. The vehicle conveyor system of claim 3, wherein the surface has surface properties selected such that the coefficient of friction is lower than 0.2.

5. The vehicle conveyor system of claim 4, wherein the surface is at least partially made of polytetrafluoroethylene.

6. The vehicle conveyor system of claim 4, wherein the surface is at least partially made of a polymer.

7. The vehicle conveyor system of claim 6, wherein the polymer is an ultra high molecular weight polyethylene (UHMW).

8. The vehicle conveyor system of claim 7, wherein an additive is added to the UHMW to decrease the coefficient of friction of the surface.

9. The vehicle conveyor system of claim 4, further comprising a lubrication arrangement for lubricating the surface.

10. The vehicle conveyor system of claim 9, wherein the lubrication arrangement includes at least one nozzle positioned to spray a lubricating fluid onto the surface.

11. The vehicle conveyor system of claim 9, wherein the lubrication arrangement includes at least one aperture in the deck region in fluid communication with a lubricating fluid source configured to dispense a lubricating fluid through the at least one aperture.

12. The vehicle conveyor system of claim 4, wherein the lubricating fluid includes a surfactant.

13. A surface system for a vehicle conveyor for a vehicle having a plurality of wheels, the surface system comprising:
a surface positioned proximate to at least one of an inlet end of the vehicle conveyor, and an exit end of the vehicle conveyor; and
a lubrication arrangement positioned to supply a lubricating fluid on top of the surface,
wherein the surface, when lubricated with the lubricating fluid, has surface properties selected such that a coefficient of friction between the surface and tire rubber is below a selected threshold so as to permit sliding of at least one of the plurality of wheels on the surface while at least another of the plurality of wheels is supported on the vehicle conveyor.

14. The surface system of claim 13, wherein the lubrication arrangement includes at least one nozzle in fluid communication with a lubricating fluid source and positioned to spray the lubricating fluid onto the surface.

15. The surface system of claim 13, wherein the lubrication arrangement includes at least one aperture in the surface in fluid communication with a lubricating fluid source configured to dispense the lubricating fluid through the at least one aperture.

16. The surface system of claim 13, wherein the lubricating fluid includes a surfactant.

* * * * *